United States Patent [19]
Hamatani

[11] Patent Number: 5,952,811
[45] Date of Patent: Sep. 14, 1999

[54] DEVICE FOR SHUTTING OFF CURRENT THROUGH A MOTOR START-UP CIRCUIT AFTER A SPECIFIED WAIT PERIOD

[75] Inventor: Junichi Hamatani, Shiga, Japan

[73] Assignee: Murata Manufacturing Co., Ltd., Kyoto, Japan

[21] Appl. No.: 08/856,950

[22] Filed: May 15, 1997

[30] Foreign Application Priority Data

May 20, 1996 [JP] Japan ................................. 8-124356

[51] Int. Cl.⁶ ...................................................... H02P 1/42
[52] U.S. Cl. ......................... 318/788; 318/753; 318/786; 318/792
[58] Field of Search ................................. 318/778–797, 318/749–755

[56] References Cited

U.S. PATENT DOCUMENTS

| | | | |
|---|---|---|---|
| 3,643,142 | 2/1972 | McBride Jr. .............................. | 318/788 |
| 3,671,830 | 6/1972 | Kruper ..................................... | 388/821 |
| 3,832,612 | 8/1974 | Woods ..................................... | 388/821 |
| 3,852,648 | 12/1974 | Barry et al. .............................. | 318/795 |
| 3,855,509 | 12/1974 | Wright ..................................... | 318/753 |
| 3,864,844 | 2/1975 | Heidtmann ................................ | 34/528 |
| 4,276,506 | 6/1981 | Little ....................................... | 318/806 |
| 5,617,001 | 4/1997 | Nacewicz et al. ....................... | 318/788 |
| 5,757,162 | 5/1998 | Weber ..................................... | 318/821 |

FOREIGN PATENT DOCUMENTS 6-339291  12/1994  Japan .

OTHER PUBLICATIONS

Patent Abstract of Japan: Publication No. 08251959; Date of Publication of Application Sep. 27, 1996.

*Primary Examiner*—David Martin
*Attorney, Agent, or Firm*—Majestic, Parsons, Siebert & Hsue P.C.

[57] ABSTRACT

A device for automatically shutting off a current is used in combination with a motor start-up component incorporated in a motor-driving circuit including an auxiliary coil which operates at a start-up time of a motor and a main coil for its steady-state operation. This motor start-up component includes a motor start-up thermistor with positive temperature characteristic having a first electrode and a second electrode, a first connector member having a first male terminal part and connected to the first electrode and a second connector member having a second male terminal part and connected to the second electrode. The motor start-up thermistor is connected in series to the auxiliary coil through the first electrode. The current-shutting device includes first and second terminal members each having a female terminal part for receiving a corresponding one the male terminal parts, a triac having a first triac terminal, a second triac terminal and a gate terminal, a triac-controlling thermistor with positive temperature characteristic and a case which encloses at least the triac and the triac-controlling thermistor.

11 Claims, 10 Drawing Sheets

DEVICE FOR SHUTTING OFF CURRENT THROUGH A MOTOR START-UP CIRCUIT AFTER A SPECIFIED WAIT PERIOD

BACKGROUND OF THE INVENTION

This invention relates to a device for shutting off the current through a start-up circuit for a motor using a thermistor with a positive temperature characteristic (herein referred to as the PTC thermistor) after a specified wait period has elapsed. This invention relates in particular to such a device adapted to be used in combination with such a motor start-up circuit.

Figure 16:
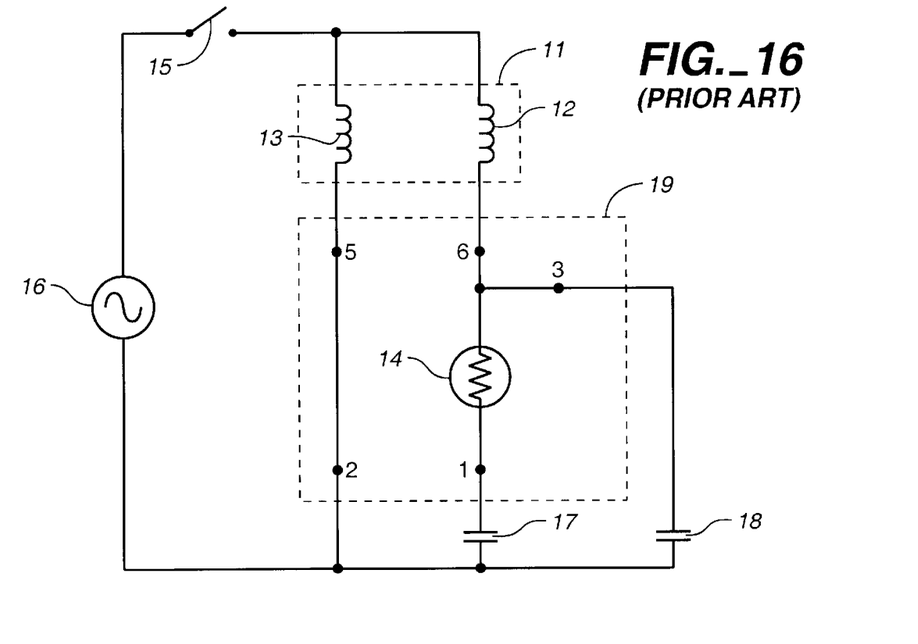
FIG. 16 is a block diagram of a motor-driving circuit incorporating a prior art motor start-up circuit.

FIG. 16 shows a prior art driving circuit for a motor 11, such as a single-phase inductive motor which may be used in a compressor for a refrigerator, comprising an auxiliary coil 12 which is activated at the start-up time of the motor 11 and a main coil 13 for a steady-state operation of the motor 11. The start-up circuit incorporated in this motor-driving circuit is for a motor of the so-called CSR (Capacitor Start and Run) type and is provided with a PTC thermistor 14 for motor start-up which is connected in series with the auxiliary coil 12.

A power source 16 is connected to the motor 11 through a switch 15. When the switch 15 is closed to supply power to the motor 11, a relatively large current flows in the beginning to the auxiliary coil 12 through the PTC thermistor 14 to start up the motor 11. A specified wait period of time after the start-up of the motor 11 has been completed, the PTC thermistor 14 serves to reduce the current to the auxiliary coil 12 by increasing its own resistance with the heat it generates.

There is a capacitor 17 for motor start-up connected in series with the PTC thermistor 14 and another capacitor 18 for the operation of the motor connected in parallel with the PTC thermistor 14 and the start-up capacitor 17. The start-up capacitor 17 is provided, if the motor 11 is a single-phase inductive kind, for providing a phase shift of 90 degrees for increasing the start-up torque given by the auxiliary coil 12. The motor-operating capacitor 18 serves to prevent pulsations after the motor 11 has been started up and to increase efficiency of its rotary motion. Either or both of these capacitors 17 and 18 may be unnecessary, depending on the kind of motor to be started up.

The portion of the circuit of FIG. 16, including the PTC thermistor 14 and enclosed by broken line 19, is commercially available as a component for the start-up of a motor. Five terminals 1, 2, 3, 5 and 6 for external connections are provided, and the PTC thermistor is encapsulated in a case (not shown) which supports these terminals 1, 2, 3, 5 and 6.

Since the resistance of the PTC thermistor 14 incorporated in the motor start-up component 19 of FIG. 16 does not become infinitely large, a wasteful current will continue to flow through it to the auxiliary coil 12 even after the motor 11 has been started up. The wasted power may reach the magnitude of several watts, and the PTC thermistor will continue to generate heat.

Figure 17:
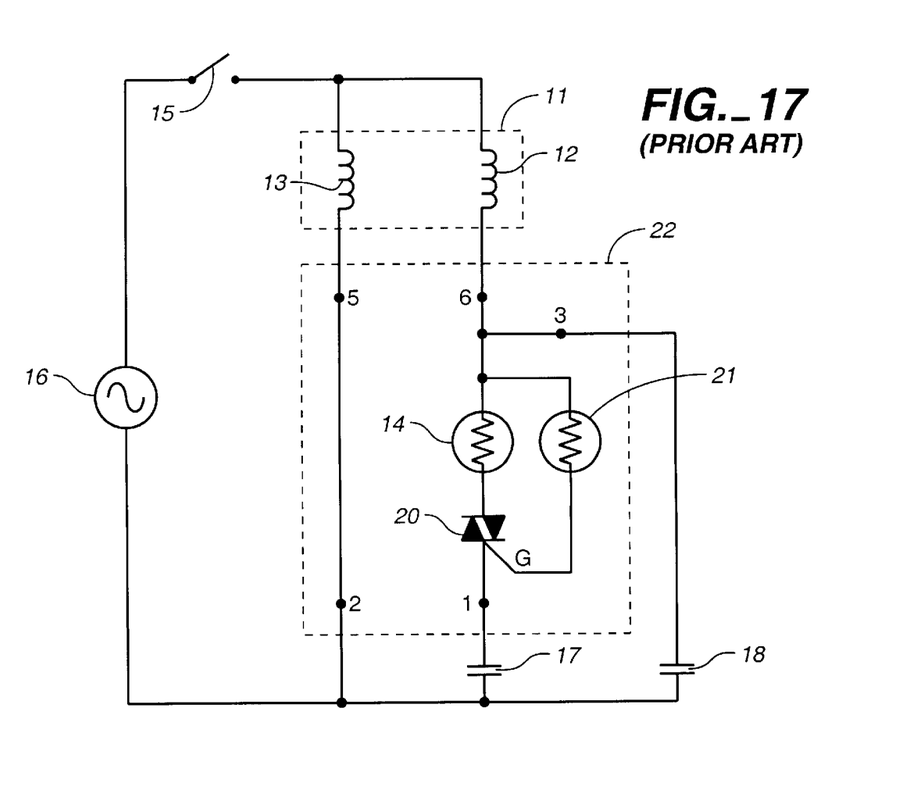
FIG. 17 is a block diagram of a motor-driving circuit incorporating another prior art motor start-up circuit.

Japanese Patent Publication Tokkai 6-339291, on the other hand, disclosed a motor driving circuit incorporating a start-up circuit as shown in FIG. 17, wherein like components are indicated by the same numerals and may not be repetitiously explained. The circuit shown in FIG. 17 is characterized as having a triac 20, as well as a PTC thermistor 14 for motor start-up, connected in series with the auxiliary coil 12. There is also provided another PTC thermistor 21 for controlling the triac 20 connected in parallel with the motor start-up thermistor 14, one of the electrodes of the triac-controlling PTC thermistor 21 being connected to the gate G of the triac 20.

At the time of motor start-up with a circuit as shown in FIG. 17, when power from the source 16 is supplied to the motor 11, a trigger signal is applied to the gate G of the triac 20 through the triac-controlling PTC thermistor 21. This makes the triac 20 conductive and a current for the motor start-up is caused to flow to the auxiliary coil 12 through the motor start-up PTC thermistor 14. A specified length of time after the motor 11 has thus been started up, the motor start-up PTC thermistor 14 increases its resistance due to the heat it generates and thereby reduces the current to the auxiliary coil 12. At the same time, the triac-controlling PTC thermistor 21 reduces the current to the gate G of the triac 20 by increasing its own resistance due to the heat it generates. The triac 20 then returns to its OFF condition, shutting off the current to the auxiliary coil 12 no longer needed after the motor 11 has been started up.

A small current will thereafter continue to flow through the triac-controlling PTC thermistor 21 but since a thermistor with much smaller thermal capacitor can be used as the triac-controlling PTC thermistor 21 than as the motor start-up PTC thermistor 14, only a very small current is needed to keep the triac-controlling PTC thermistor 21 in a high-temperature condition with a high resistance. In summary, the power consumption can be significantly less than if the circuit shown in FIG. 16 is used.

The portion of the circuit of FIG. 17, including the triac 20 and the two PTC thermistors 14 and 21 and enclosed by the broken line 22 can also be unitized as a component for motor start-up, encapsulated in a case and provided with five terminals 1, 2, 3, 5 and 6 for external connections.

The current for starting up the motor 11, however, must be maintained for a specified length of time until the start-up is completed. The time it takes to become about one-half of the rush current is referred to as its operating time. The operating time becomes shorter as the volume of the motor start-up PTC thermistor 14 is reduced because its heat-up time also becomes shorter. Thus, motor start-up PTC thermistors having different volumes are necessary, corresponding to motors of different kinds, whether for the component 19 shown in FIG. 16 or for the component 22 shown in FIG. 17. For a motor requiring a long operating time, in particular, a large motor start-up PTC thermistor is required.

Let us consider next the return time, which is the time required after the motor 11 has started up and the current to the motor start-up PTC thermistor 14 has been shut off until the switch 15 is opened and can then be turned on again. There is no problem in turning on the switch a sufficiently long time after the current to the motor start-up PTC thermistor 14 has been shut off. When, for example, the component 22 is being used in connection with a motor for the compressor of a refrigerator, if the refrigerator door is opened and its inner temperature rises immediately after the thermostat has been switched off or if there is a momentary power failure and the motor 11 has been stopped such that the motor 11 must be restarted, a large motor start-up PTC thermistor 14 may not be quick enough to cool down for the start-up of the motor.

It has therefore been considered necessary to design the motor 11 by taking into account the time required for the motor start-up PTC thermistor 14 to lower its temperature. There are situations, however, where the design of the motor 11 cannot be easily modified. In such a situation, it is necessary to somehow improve the thermal radiation of the motor start-up PTC thermistor 14. As a practical matter, however, there is a limit to how much thermal radiation of the motor start-up PTC thermistor 14 can be improved.

Moreover, the size of the motor start-up PTC thermistor 14 is changed according to the operating time of the motor 11. As a result, the components 19 and 22 are required to be able to incorporate motor start-up PTC thermistors 14 of different sizes. If cases of only one size are prepared for these components 19 and 22, this size must be selected so as to be able to contain the largest of the motor start-up PTC thermistors 14. If a smaller one of the motor start-up PTC thermistors 14 is contained in such a case, not only does it give rise to a wasted space inside the case but these is a waste in terms of the material for the case. Although cases of a single size may be used for containing thermistors of different sizes, furthermore, other components for the electrical connections of elements therein such as the motor start-up PTC thermistors cannot be produced all in the same size, and components of different sizes must be prepared. This also contributes to a rise in the production cost. Thus, using cases of only one size cannot bring about a significant overall reduction in the production cost.

If cases of different sizes are to be prepared corresponding to the different sizes of the motor start-up PTC thermistors 14, on the other hand, the waste in the material for the cases can be reduced but the cost of the cases will go up caused by the production of more than one kind of products. In addition, many kinds of components such as terminals for electrical connections are required and their cost is also increased, and the number of different types of these components is also greater than if all cases are of the same size. As a result, the production efficiency is lowered, and the overall production cost will be higher than if cases of only one kind are to be produced.

It is also to be remembered that there are many ways to start up a motor. Thus, the components 19 and 22 require different kinds of terminals corresponding to different kinds of motor start-up. This is another factor to be taken into consideration.

The problems discussed above all apply both to the component 19 shown in FIG. 16 and the component 22 shown in FIG. 17 but they are more serious with the component 22 of FIG. 17. Suppose, for example, that it is being attempted to improve the thermal radiation of the motor start-up PTC thermistor 14 in order to reduce the time in which the motor 11 can be restarted. In the case of the component 22 shown in FIG. 17, however, there are both the triac 20 and the triac-controlling PTC thermistor 21 as sources of heat in addition to the motor start-up PTC thermistor 14, preventing thermal radiation of the latter. Moreover, the component 22 of FIG. 17 includes more constituent parts than the component 19 of FIG. 16 and hence requires a larger case. This is why the problems discussed above are more severe with the component 22 of FIG. 17. It is also to be noted that a material such as a heat-resistant resin must be used adequate for the motor start-up PTC thermistor 14 which emits more heat and reaches a high temperature than the triac-controlling PTC thermistor 21, and this affects the price of the cases. This means that it is disadvantageous to increase the size of the case.

Although not shown in FIG. 17, it is usually necessary to provide a metallic heat-radiating plate or the like to the heat-radiating part of the triac 20 in order to control the rise in its temperature 20 and its thermal run-away due to the motor start-up PTC thermistor 14. This is another reason that the component 19 of FIG. 17 has an increased number of parts, affecting the production cost adversely.

SUMMARY OF THE INVENTION

It is therefore an object of this invention to eliminate the problems described above, or to provide an improved motor start-up device having the advantages of the prior art component 22 shown in FIG. 17 but having it divided into a portion corresponding to the component 19 shown in FIG. 16 and another portion containing the triac 20 and the triac-controlling PTC thermistor 21 to provide the automatic current shut-off capability such that the part of the latter for providing the automatic shut-off capability can be treated as a separate element which can be easily used in combination with the motor start-up PTC component 19.

Explained more in detail, a device embodying this invention, with which the above and other objects can be accomplished, may be characterized firstly as being for use in combination with a motor start-up component incorporated in a motor-driving circuit including an auxiliary coil which operates at a start-up time of a motor and a main coil for its steady-state operation. This motor start-up component includes a motor start-up thermistor with positive temperature characteristic having a first electrode and a second electrode, a first connector member having a first male terminal part and connected to the first electrode and a second connector member having a second male terminal part and connected to the second electrode. The motor start-up thermistor is connected in series to the auxiliary coil through the first electrode. The device of this invention is further characterized as comprising a first terminal member having a first female terminal part for receiving the first male terminal part, a second terminal member having a second female terminal part for receiving the second male terminal part, a triac having a first triac terminal, a second triac terminal and a gate terminal, a triac-controlling thermistor with positive temperature characteristic and a case which encloses at least the triac and the triac-controlling thermistor. The first triac terminal is connected to the second terminal member, and the triac-controlling thermistor has one electrode connected to the first terminal member and another electrode connected to the gate terminal. A third terminal member is further connected to the second triac terminal.

According to a preferred embodiment, the first and second terminal members are supported by the case such that the first and second female terminal parts respectively accept the first and second male terminal parts when the device is combined with the motor start-up component. The case may have an opening, which is closed with the motor start-up component when the device is combined with it. At least one of electric connections between the first terminal member and the triac-controlling thermistor and between the second terminal member and the first triac terminal may be by a lead line which is pulled out of the case.

Many modifications and variations are possible, in part depending on the type of motor to be started up.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, like components are indicated by the same numerals and may not always be described repetitiously.

DETAILED DESCRIPTION OF THE INVENTION

FIGS. 1, 2, 3 and 4 show circuits of devices 23, 24, 25 and 26, each embodying the present invention, indicating like components by like numerals as used in FIGS. 16 and 17 and without repetitiously explaining what these numbers indicate. It is to be noted that each of these devices 23–26 includes a motor start-up component 19 including a motor start-up PTC thermistor 14, as shown in FIG. 16. To explain for the sake of completeness of description, this motor start-up component 19 has five terminals 1, 2, 3, 5 and 6, a motor start-up PTC thermistor 14 having a first electrode 27 and a second electrode 28, a first terminal member 29 connected to the first electrode 27 and a second terminal member 30 connected to the second electrode 28. The first terminal member 29 is formed integrally with the terminals 3 and 6, having a first male terminal part 31 which serves as the terminal 3. The second terminal member 30 serves to provide the terminal 1, having a second male terminal part 32. The motor start-up component 19 is also provided with a third terminal member 33, which has a third male terminal part 34 to serve as the terminal 2, for integrally forming the terminals 2 and 5, independently of the motor start-up PTC thermistor 14. As shown in FIG. 16, the motor start-up PTC thermistor 14 is connected in series with an auxiliary coil 12 through the terminal 6 of the first terminal member 29 connected to the first electrode 27.

Figure 5:
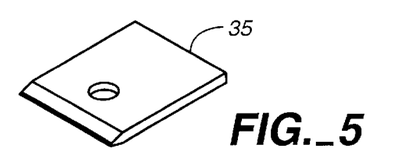
FIG. 5 is a diagonal view of a terminal member used in a device embodying this invention, having a male terminal part.
Figure 6:
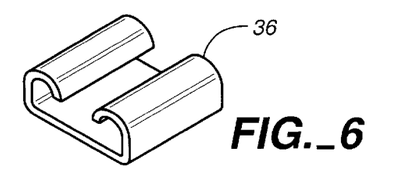
FIG. 6 is a diagonal view of a terminal member used in a device embodying this invention, having a female terminal part.
Figure 7:
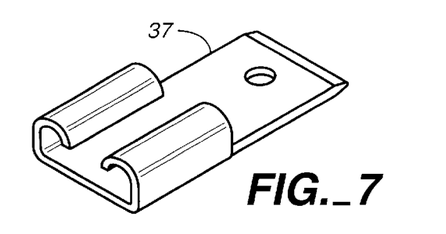
FIG. 7 is a diagonal view of a terminal member used in a device embodying this invention, having a male terminal part and a female terminal part formed integrally.

Each of the devices 23–26 according to this invention, adapted to be used in combination with such a motor start-up component indicated by numeral 19, is provided with terminals A, B and C to be connected respectively to the terminals 1, 2 and 3. In these devices 23–26, any of the terminal members shaped as shown in FIGS. 5, 6 and 7 may be used as the terminals A, B and C, FIG. 5 showing a terminal member 35 of the type having a male terminal part such as a fast-on terminal, FIG. 6 showing a terminal member 36 of the type having a female terminal part capable of accepting a male terminal part, and FIG. 7 showing a terminal member 37 of the type having both a male terminal part and a female terminal part formed integrally. As will be explained in detail below, these three types of terminal members 35–37 are suitably utilized according to this invention corresponding to the start-up type of the motor.

Each of the devices 23–26 may be described generally as being provided with a first terminal member 39 having a first female terminal part 38 serving as the terminal C for receiving the first male terminal part 31 of the motor start-up component 19, a second terminal member 41 having a second female terminal part 40 serving as the terminal A for receiving the second male terminal part 32, a triac 20 with a first terminal 42, a second terminal 43 and a gate terminal G and having its first terminal 42 connected to the second terminal member 41, a triac-controlling PTC thermistor 21 having an electrode 44 connected to the first terminal member 39 and another electrode 45 connected to the gate terminal G, and a third terminal member 47 having a male terminal part 46 connected to the second terminal 43 of the triac 20. Although not shown in FIGS. 1–4, a case is also provided for containing therein at least the triac 20 and the triac-controlling PTC thermistor 21.

Figure 1:
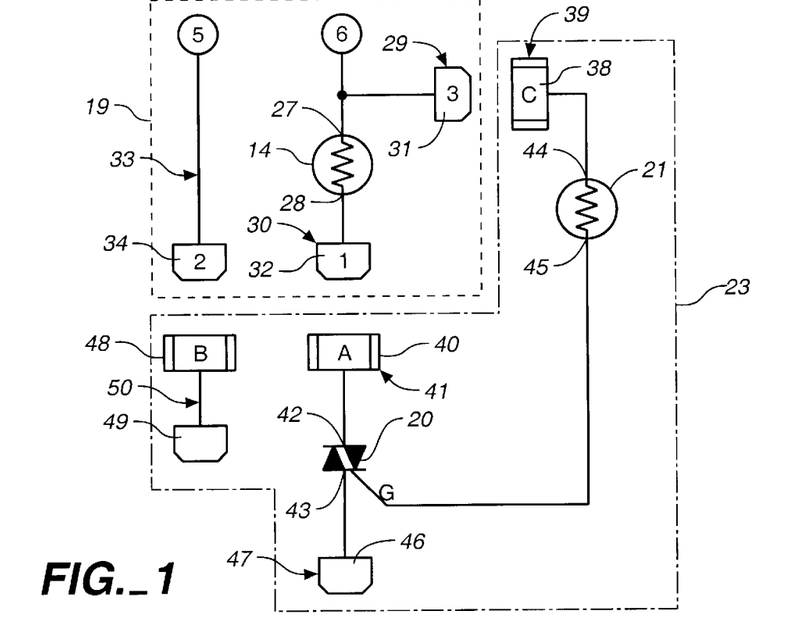
FIGS. 1, 2, 3 and 4 are block diagrams of devices according respectively to first, second, third and fourth embodiments of this invention, as well as motor start-up components to be connected therewith.

Explained more in detail, the device 23 according to the first embodiment of invention shown in FIG. 1 is for a motor of the so-called CSIR (Capacitor Start Induction Run) type, being additionally provided with a fourth terminal member 50 having a female terminal part 48 serving as the terminal B for accepting the third male terminal member 34 of the motor start-up component 19 and a male terminal part 49. In this device 23, the first and second terminal members 39 and 41 are realized by the terminal member 36 shown in FIG. 6 having only a female terminal part, the third terminal member 47 is realized by the terminal member 35 shown in FIG. 5 having only a male terminal part, and the fourth terminal member 50 is realized by the terminal member 37 shown in FIG. 7 having both a male terminal part and a female terminal part formed integrally.

Figure 2:
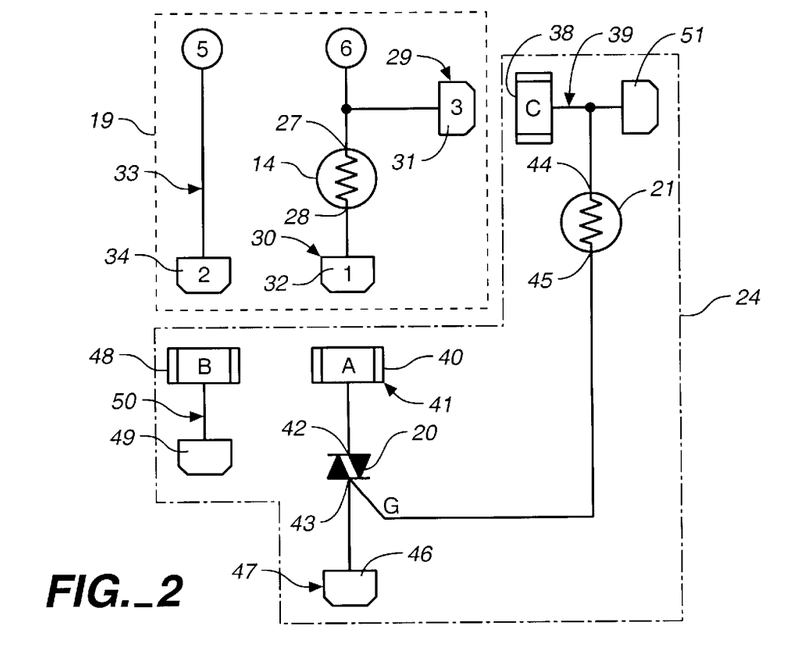

The device 24 according to the second embodiment of the invention shown in FIG. 2 is for a motor of the CSR type. This is different from the device 23 shown in FIG. 1 only in that its first terminal member 39 has not only a female terminal part 38 but also a male terminal part 51. Thus, the first terminal member 39 in this device 24 is realized by the terminal member 37 shown in FIG. 7 having both a male terminal part and a female terminal part formed integrally.

Figure 3:
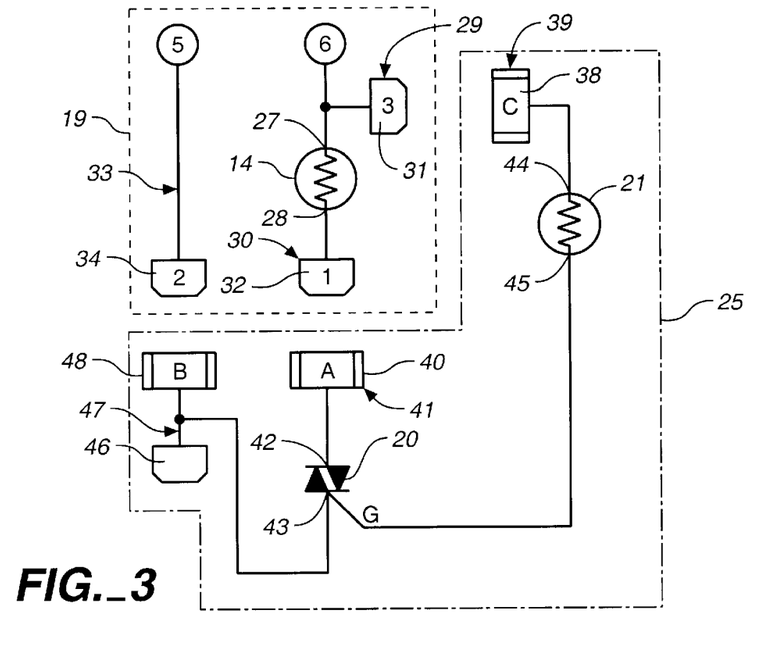

The device 25 according to the third embodiment of the invention shown in FIG. 3 is for a motor of the so-called RSIR (Resistance Start Induction Run) type and is different from the device 23 shown in FIG. 1 in that the fourth terminal member 50, separated from the third terminal member 47, is not provided and that the third terminal member 47 is realized by the terminal member 37 shown in FIG. 7 having both a male terminal part and a female terminal part formed integrally, thereby serving as the terminal B to accept not only the male terminal part 46 but also the male terminal part 34 of the motor start-up component 19.

Figure 4:
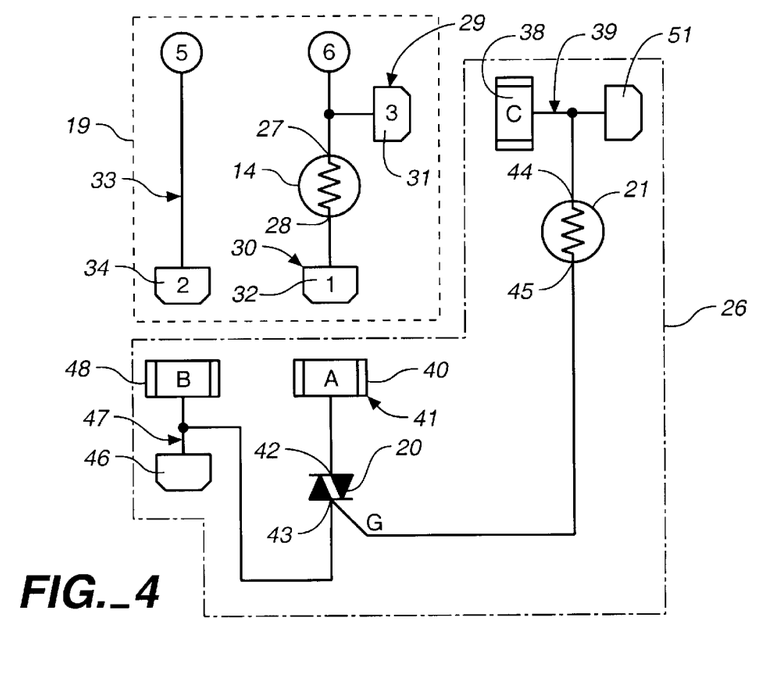

The device 26 according to the fourth embodiment of the invention shown in FIG. 4 is for a motor of the so-called RSCR (Resistance Start Capacitor Run) type and is different from the device 25 shown in FIG. 3 only in that the first terminal part 39 has not only a female terminal part 38 but also a male terminal part 51, as was the case with the device 24 shown in FIG. 2. Thus, the first terminal member 39 in this device may be realized by the terminal member 37 shown in FIG. 7 having a male terminal part and a female terminal part formed integrally.

Next, the mechanical structure of these devices 23–26 are described in detail with reference to FIGS. 8–11 which show portions of the device 24 represented in FIG. 2, adapted to be combined with the motor start-up component 19 for a motor of the CSR type.

Figure 8:
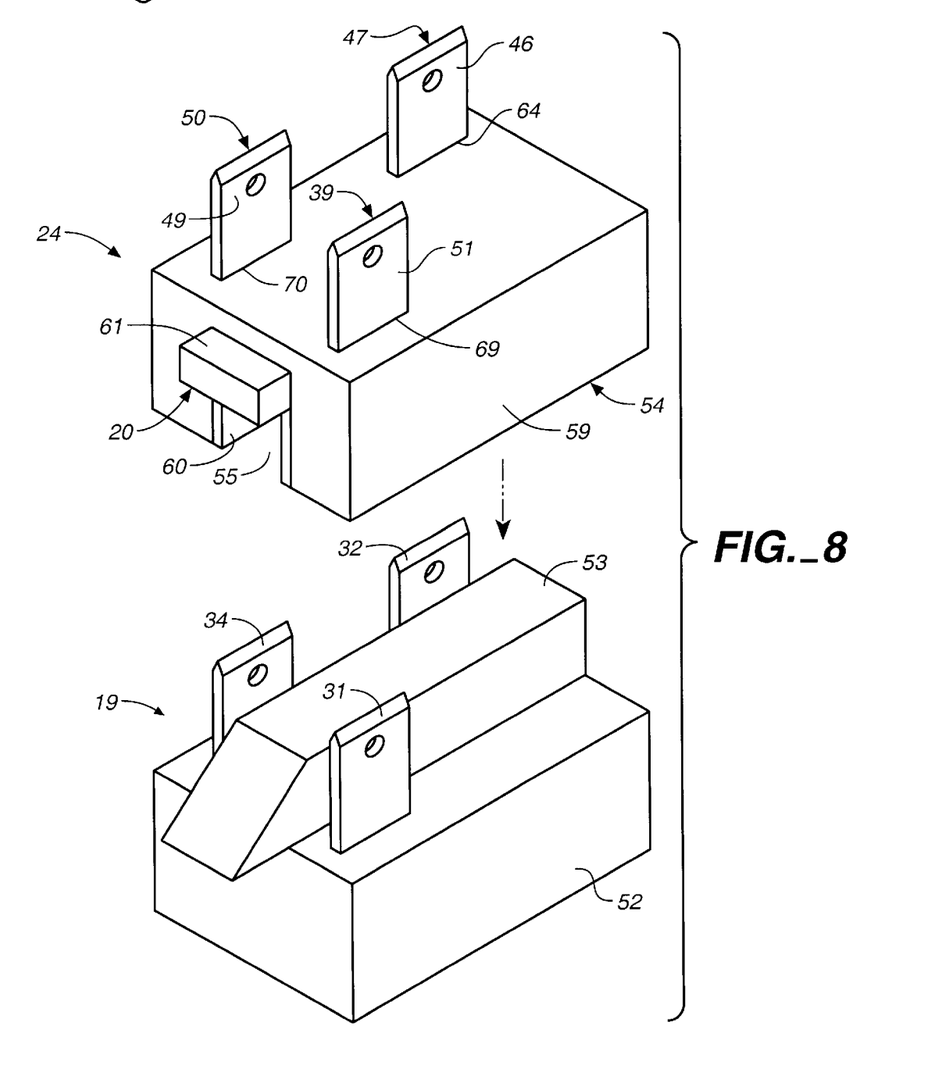
FIG. 8 is a diagonal external view of the device shown in FIG. 2, separated from the motor start-up component adapted to be combined therewith.

In FIG. 8, numeral 52 indicates a case for the motor start-up component 19, comprising a resin material with relatively high resistance against heat and having a protrusion 53 formed for containing the motor start-up PTC thermistor 14 (not shown in FIG. 8) therein. Numeral 54 indicates a case for the device 24 of FIG. 2 which may be made of a resin material with relatively low resistance against heat. An indentation 55 is formed in the case 54 of the device 24 for accepting the protrusion 53 such that these protrusion 53 and indentation 55 fit and engage with each other when the device 24 is mechanically combined with the motor start-up component 19.

Figure 11:
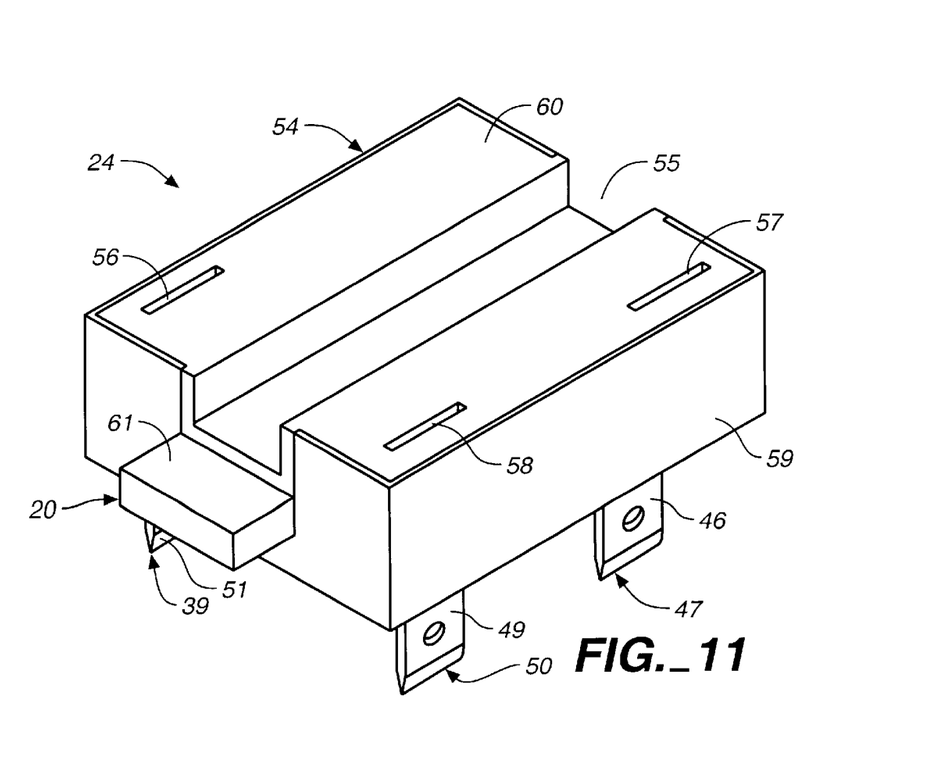
FIG. 11 is a diagonal bottom view of the device shown in FIG. 8.

The first, second and third male terminal parts 31, 32 and 34 protrude from the motor start-up component 19. Correspondingly, holes 56, 57 and 58 are formed in the case 54 of the device 24, as shown in FIG. 11, for admitting therein these male terminal parts 31, 32 and 34. The case 54 comprises a main body 59 and a cover 60, and these holes 56-58 are formed through the cover 60.

The triac 20 and the triac-controlling PTC thermistor 21 are contained inside the case 54 of the device 24. The triac 20 has its heat-radiating part 61 placed outside the case 54 such that the rise in its temperature can be restrained and its reliability can be improved. The aforementioned first, second, third and fourth terminal members 39, 41, 47 and 50 are supported by the main body 59.

Figure 9:
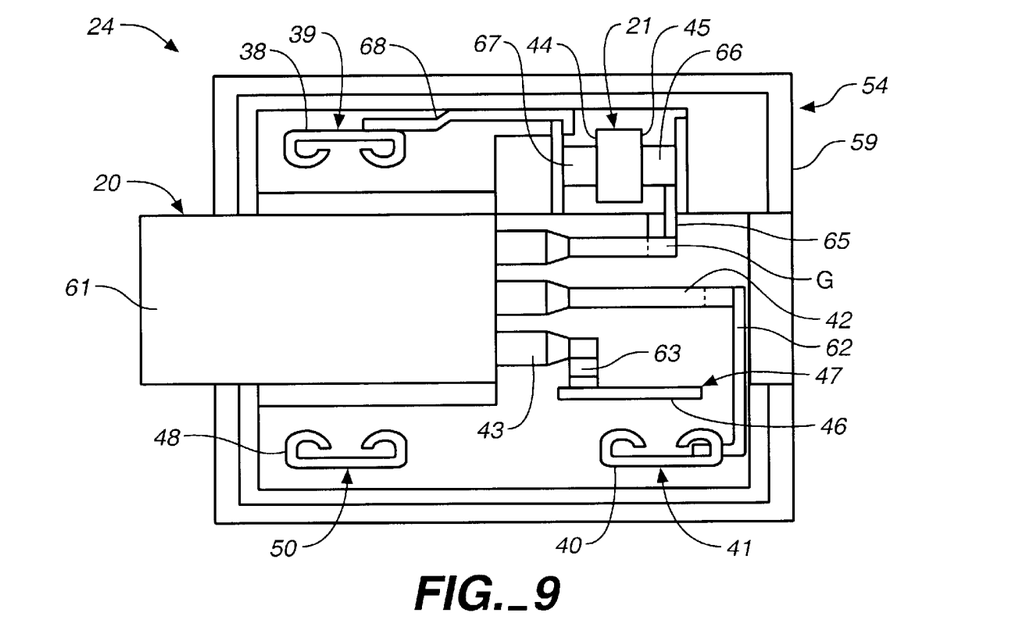
FIG. 9 is a bottom view of the device shown in FIG. 2 with its cover removed.
Figure 10:
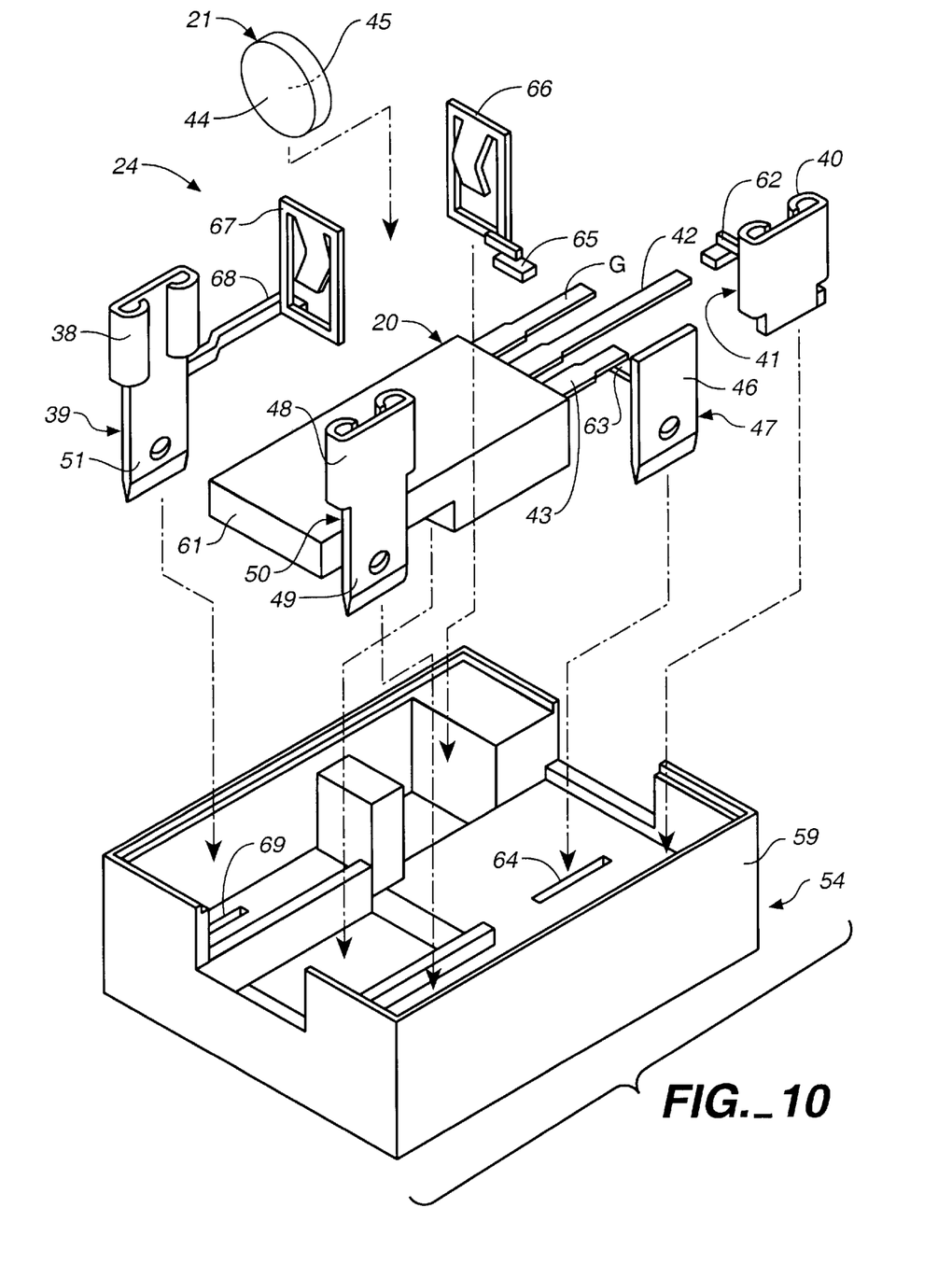
FIG. 10 is an exploded diagonal view of the components of the device shown in FIG. 9, contained inside the main body of its case.

Explained more in detail with reference to FIGS. 9 and 10, the triac 20 is disposed between the first terminal member 39 and the fourth terminal member 50 inside the main body 59, lying sideways with its larger surface facing downward. Its first terminal 42 is connected through a connector member 62 to the second terminal member 41, which is positioned by means of a positioning indentation (not shown) formed on the main body 59 such that its female terminal part 40 fits in the hole 57 through the cover 60. The second terminal 43 of the triac 20 is connected through another connector member 63 to the third terminal member 47, which is positioned by passing through a positioning slit 64 formed in the main body 59, having its male terminal part 46 protruding out of the main body 59.

The gate terminal G of the triac 20 is connected through still another connector member 65 to a spring terminal member 66 having a spring contact piece and adapted to achieve an electric contact by elastically compressing onto the electrode 45 of the triac-controlling PTC thermistor 21. Another similarly structured spring terminal member 67 contacts the terminal 44 of the triac-controlling PTC thermistor 21. These spring terminal members 66 and 67 are positioned inside the main body 59 with a specified distance therebetween. The triac-controlling PTC thermistor 21 is held by these two spring terminal members 66 and 67 by being sandwiched elastically therebetween.

The first terminal member 39 is connected to the spring terminal member 67 through a connector member 68, being positioned by passing through a positioning slit 69 formed in the main body 59 and having its male terminal part 51 protruding out of the main body 59. Its female terminal part 38 is positioned with respect to the hole 56 formed in the cover 60.

After all these components are contained inside or supported by the main body 59 of the case 54, the cover 60 is engaged to the main body 59 as shown in FIG. 11. Since all these components are substantially supported by the main body 59, the cover 60 may be dispensed with. Even if the cover 60 is not provided, the opening left for the main body 59 is eventually closed up by the case 52 of the motor start-up component 19 when they are connected together. Thus, omission of the cover 60 does not bring about any serious problem.

The device 24, formed as described above, may be connected with the motor start-up component 19, as shown by an arrow in FIG. 8, to form a circuit shown in FIG. 17. In other words, it is the same as cutting off the connections at terminals 1, 2 and 3 of the motor start-up component 19 used in the conventional way shown in FIG. 16 and inserting there the device 24 described above. Explained more in detail, the female terminal parts 40, 48 and 38, serving as the terminals A, B and C of the device 24, accept and engage with the male terminal parts 32, 34 and 31 serving as the terminals 1, 2 and 3 of the motor start-up component 19, thereby establishing their electrical contacts. It is to be noted that the device 24 is provided with three male terminal parts 46, 49 and 51. Thus, these male terminal parts 46, 49 and 51 may be inserted into the female terminal parts with which the male terminal parts 32, 34 and 31 of the motor start-up component 19 were connected before. Thus, if the three male terminal parts 46, 49 and 51 of the device 24 are designed similarly to the three male terminal parts 32, 34 and 31 of the motor start-up component 19, the insertion of the device 24 can be carried out more easily and readily.

If the switch 15 shown in FIG. 17 is closed after the device 24 and the motor start-up component 19 are connected, a current (the gate current) flows to the gate terminal G of the triac 20 through the triac-controlling PTC thermistor 21. Since the triac-controlling PTC thermistor 21 is at a normal temperature and its resistance is small when the motor 11 is started up, the gate current is sufficiently strong to turn on the triac 20. As a result, the triac 20 is triggered once every half cycle, causing a current to flow to the auxiliary coil 12 through the motor start-up PTC thermistor 14 for starting up the motor 11.

A specified length of time after the start-up of the motor 11 has been completed, the motor start-up PTC thermistor 14 heats up to reduce the current flowing to the auxiliary coil 12. At the same time, the triac-controlling PTC thermistor 21 also heats up such that the gate current becomes very weak and incapable of turning on the triac 20. Since there is no current flowing through the motor start-up PTC thermistor 14 at this moment, not only can wasteful consumption of electric power be avoided but also the motor start-up PTC thermistor 14 is cooled down to the level of normal temperature.

A very small current will continue to flow thereafter through the triac-controlling PTC thermistor 21, but the triac-controlling PTC thermistor 21 has normally less than one fifth of the volume of the motor start-up PTC thermistor 14. Thus, the waste of electrical power can be reduced to less than one fifth. The return time, required until the motor 11 can be restarted, can also be reduced significantly.

Figure 12:
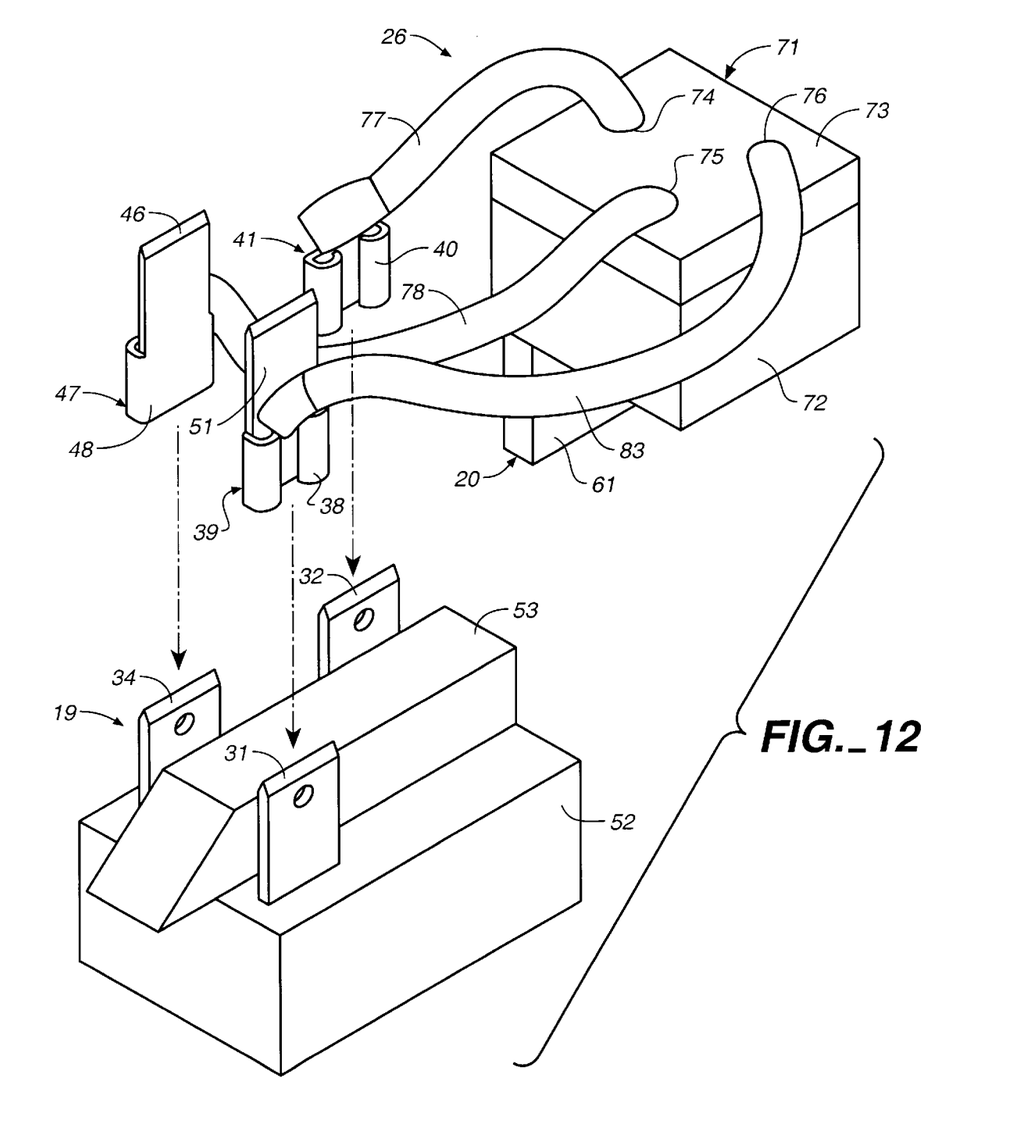
FIG. 12 is a diagonal external view of the device shown in FIG. 4, separated from the motor start-up component adapted to be combined therewith.
Figure 13:
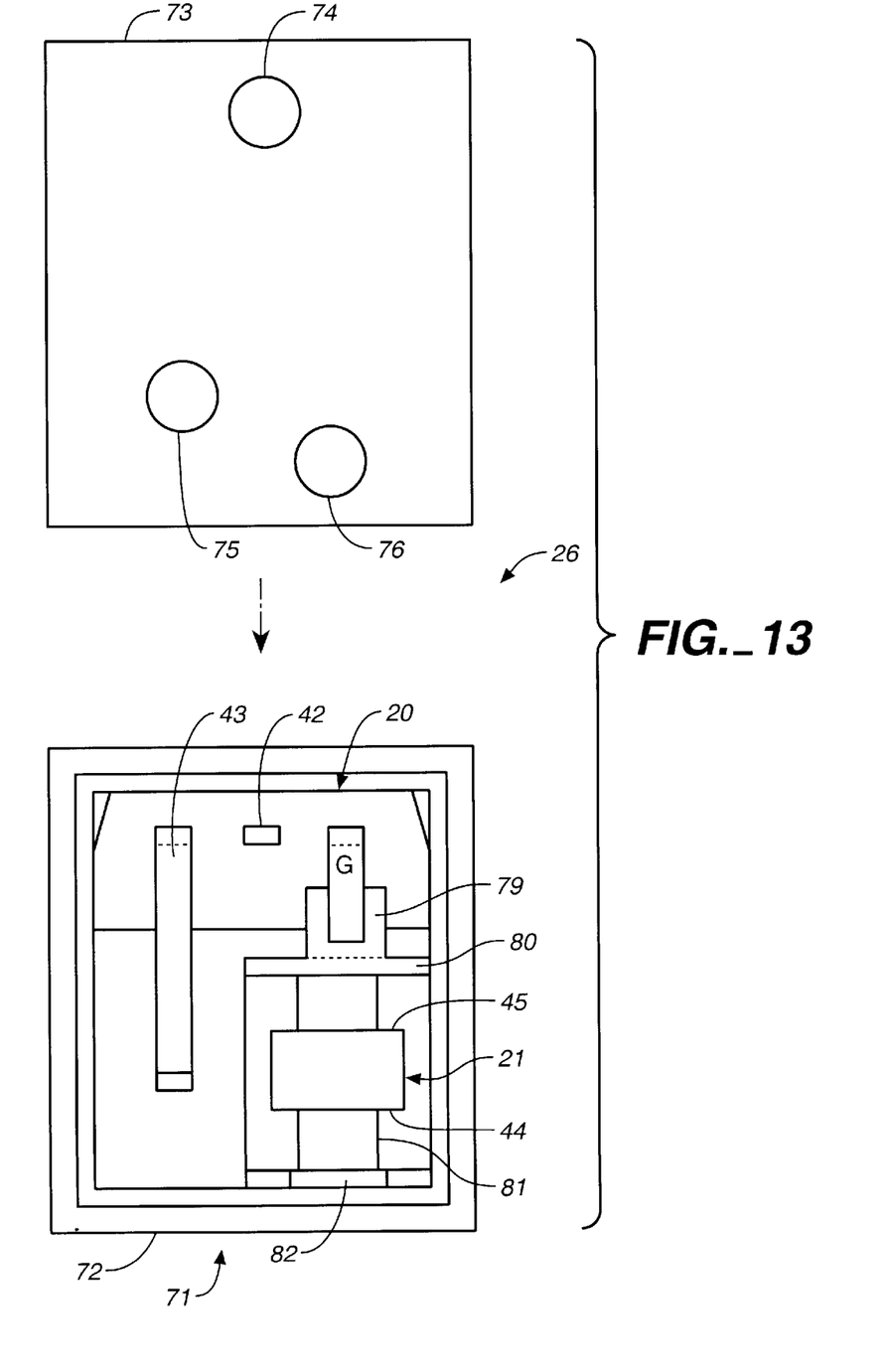
FIG. 13 is a plan view of the device of FIG. 12 with its cover removed.
Figure 14:
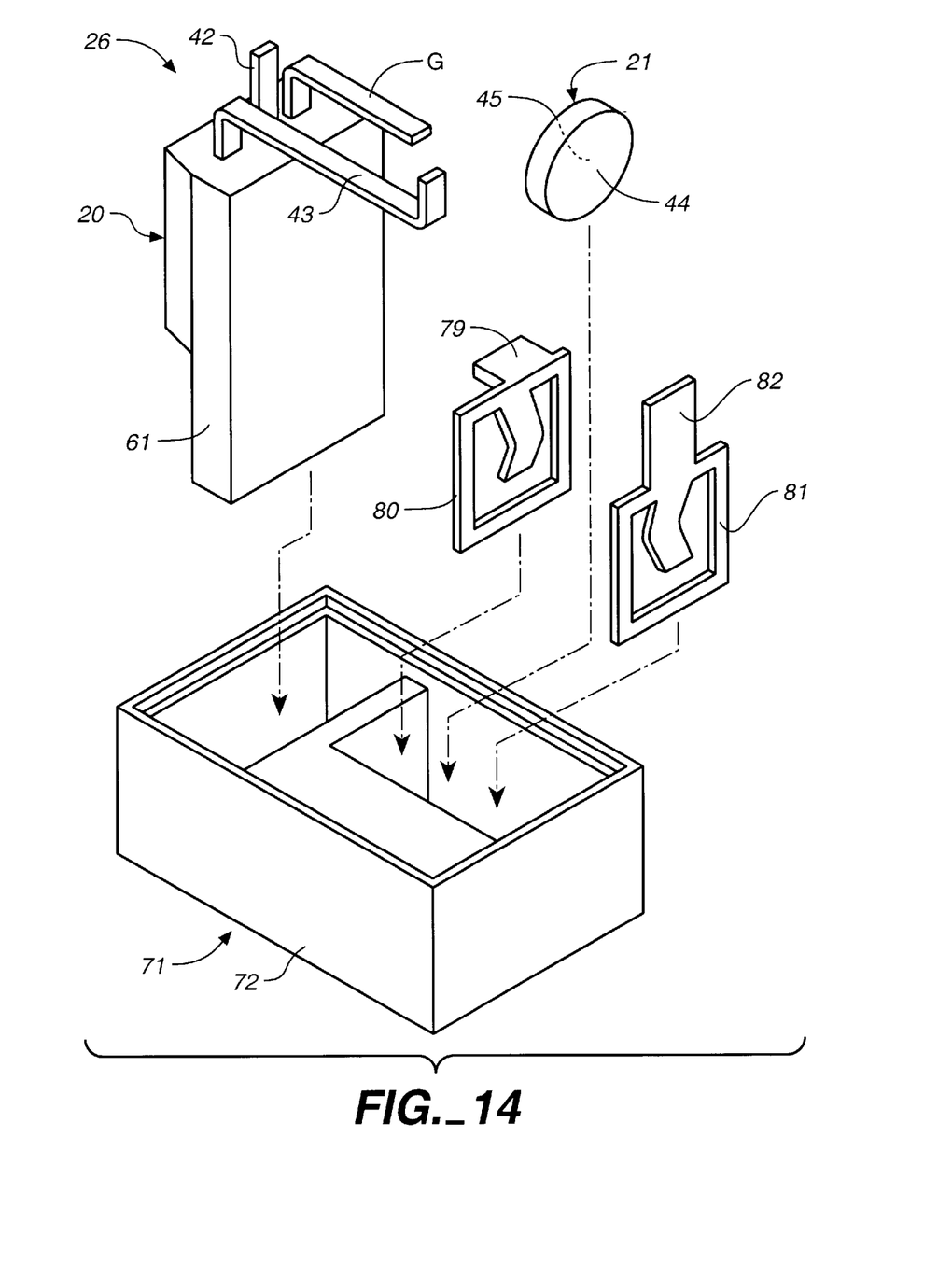
FIG. 14 is an exploded diagonal view of the components of the device shown in FIG. 13, contained inside the main body of its case.

FIGS. 12–14 show the structure of the device 26 shown in FIG. 4 for use with a motor of the RSCR type in combination with the motor start-up component 19 structured as shown in FIG. 8. Like components shown in FIGS. 12–14 and FIGS. 8–11 are indicated by the same numerals and may not be repetitively explained. The device 26 has its components such as the triac 20 and the triac-controlling PTC thermistor 21 contained in a case 71, which comprises a main body 72 and a cover 73, except, however, the triac 20 has its heat radiating part 61 protruding out of the case 71, as shown in FIG. 12. The cover 73 has three holes 74, 75 and 76.

Described more in detail, the triac 20 is disposed inside the main body 72 but towards one side, lying with its broader surface facing sideways. The first, second and gate terminals of the triac 20 are again indicated respectively by numerals 42 and 43 and letter G. The first terminal 42 has an insulated covered lead line 77 connected to it, say, by soldering. This lead line 77 is passed through the hole 74 in the cover 73 to the exterior of the case 71, having its other end connected, say, by soldering, to the second terminal member 41 having a female terminal part 40. The second terminal 43 is connected likewise to another insulated covered lead line 78 which is passed through the hole 75 in the cover 73 to the exterior of the case 71, having its other end connected likewise to the third terminal member 47 having both a male terminal part 46 and a female terminal part 47. The gate terminal G is connected through a connector piece 79 to a spring terminal member 80 having a spring contact piece. The spring terminal member 80 serves to establish an electric contact with the electrode 45 of the triac-controlling PTC thermistor 21 by being elastically compressed thereto. Another spring terminal member 81 is elastically compressed against the terminal 44 of the triac-controlling PTC thermistor 21 to establish a similar electric contact thereto. These spring terminal members 80 and 81 are both positioned inside the main body 72 with a specified interval kept therebetween, elastically sandwiching to support the triac-controlling PTC thermistor 21 in between.

A still another insulated covered lead line 83 is connected, say, by soldering, to the spring terminal member 81 through a connector piece 82, being passed through the hole 76 in the cover 73 to the exterior of the case 71 and having its other end connected likewise to the first terminal member 39 having male terminal part 51 and a female terminal part 38.

The female terminal parts 38, 40 and 48 are respectively engaged with the male terminal parts 31, 32 and 34 as shown by the arrow in FIG. 12 such that these terminal members 39, 41 and 47 of the device 26 are engaged respectively with the male terminal parts 31, 32 and 34 of the motor start-up component 19. A circuit as shown in FIG. 4 is now established, and a motor of the RSCR type is ready to be started up.

With the device 26 thus structured, its female terminal members 38, 40 and 48 can be engaged with the male terminal members 31, 32 and 34 with different intervals because the lead lines 77, 78 and 83 are flexible. Not all of these connections, however, must be achieved by way of a lead line. Of the three terminal members 39, 41 and 47, it may be sufficient if one or two of them are thus connected.

Figure 15:
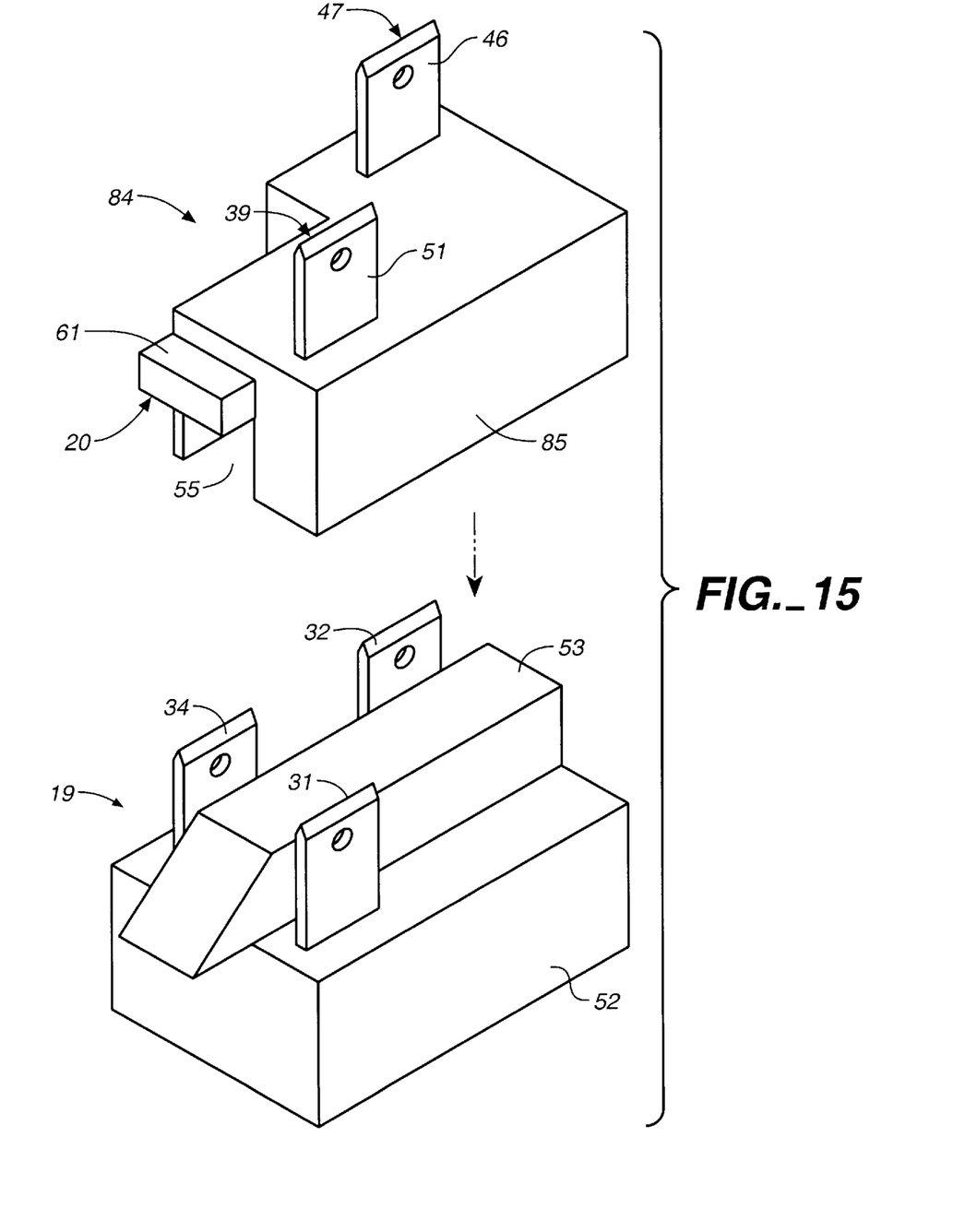
FIG. 15 is a diagonal external view of another device which is a variation of the device shown in FIG. 8.

FIG. 15 shows still another device 84 structured somewhat differently, using the same numerals for like components as in FIGS. 8–11 for convenience without repetitiously explaining what they indicate. This device 84 is distinguishable in that the fourth terminal member 50 of FIGS. 8–11 is dispensed with. Thus, when this device 84 is used, a wire must be connected directly from the power source 16 to the male terminal part 34 of the motor start-up component 19.

With the fourth terminal member 50 missing, its case 85 is shaped differently, having the part corresponding to its position removed and having only a main body without a cover. The device 84 thus designed is advantageous in that its production cost can be reduced as compared, for example, to the device 24 described above.

Although the invention has been described above by way of only a limited number of examples, these examples are not intended to limit the scope of the invention. Many modifications and limitations are possible within the scope of this invention. For example, although the device 24 shown in FIG. 11 is intended to be used for a motor of the CSR type shown in FIG. 2, it can be adapted for use for a motor of the CSIR type shown in FIG. 1 by replacing the first terminal member 39 with another having only the female terminal part 38, or by using the same first terminal member 39 but not using its male terminal part 51. Similarly, although the device 26 shown in FIG. 14 is for use for a motor of the RSCR type shown in FIG. 4, it can be adapted for use for a motor of the RSIR type shown in FIG. 3 by replacing the first terminal member 39 with another having only the female terminal part 38, or by using the same first terminal member 39 but not using its male terminal part 51. Moreover, the triac in these devices may be connected differently with the terminal members. The triac in the devices 23 and 24 may be connected by using lead lines as shown in FIG. 12, and the terminal members of the devices 25 and 26 as shown in FIG. 8 may be designed to be supported by the case.

In summary, devices according to this invention are adapted to be combined with a motor start-up component having a motor start-up PTC thermistor such as shown at 19 in FIG. 16 for shutting off the current for motor start-up, thereby reducing wasteful power consumption as done by the component shown at 22 in FIG. 17. Compared to the prior art component 22 shown in FIG. 17 which is incorporated in an integrated form with a triac and a triac-controlling PTC thermistor, however, the devices according to this invention are separated and hence better shielded against heat from the triac and the triac-controlling PTC thermistor. Thus, the present invention makes it unnecessary to provide a heat-radiating plate or the like to the triac in order to prevent its thermal run-away situation due to the heat from the motor start-up PTC thermistor. Because the separated devices according to this invention do not have to be shielded against heat from the motor start-up PTC thermistor, their cases need not be made of a heat-resistant material. Thus, a wider choice of material is available for the case. The reliability of the case can be improved while its production cost can be reduced. Another advantage of this invention is that heat from the motor start-up PTC thermistor can be radiated off more efficiency because the triac and the triac-controlling PTC thermistor are separated in a different unit. This also serves to reduce the return time in which the motor can be restarted again. Still another advantage of this invention is that the device can be used for motors of different start-up types.

What is claimed is:

1. A device for use in combination with a motor start-up component incorporated in a motor-driving circuit, said motor-driving circuit including an auxiliary coil which operates at a start-up time of a motor and a main coil for steady-state operation of said motor, said motor start-up component including a motor start-up thermistor with positive temperature characteristic having a first electrode and a second electrode, a first connector member having a first male terminal part and connected to said first electrode and a second connector member having a second male terminal part and connected to said second electrode, said motor start-up thermistor being connected in series to said auxiliary coil through said first electrode, said device comprising:

a first terminal member having a first female terminal part for receiving said first male terminal part;

a second terminal member having a second female terminal part for receiving said second male terminal part;

a triac having a first triac terminal, a second triac terminal and a gate terminal, said first triac terminal being connected to said second terminal member;

a triac-controlling thermistor with positive temperature characteristic having one electrode connected to said first terminal member and another electrode connected to said gate terminal; and     a case enclosing said triac and said triac-controlling thermistor, said motor start-up thermistor being placed outside said case.

2. The device of claim 1 wherein said first and second terminal members are supported by said case such that said first and second female terminal parts respectively accept said first and second male terminal parts when said device is combined with said motor start-up component.

3. The device of claim 1 wherein said case has an opening, said opening being closed with said motor start-up component when said device is combined with said motor start-up component.

4. The device of claim 1 wherein at least one of electric connections between said first terminal member and said one electrode and between said second terminal member and said first triac terminal is accomplished by a lead line which is pulled out of said case.

5. The device of claim 4 wherein said first terminal member also includes a male terminal part.

6. The device of claim 4 further comprising a third terminal member connected to said triac terminal, said third terminal member having a male terminal part.

7. The device of claim 4 wherein said motor start-up component further includes a third connector member which is connected in series with said main coil and has a third male terminal part, and therein said device further comprises a female terminal part capable of accepting said third male part and a forth terminal member having a male terminal part.

8. The device of claim 1 wherein said first terminal member also includes a male terminal part.

9. The device of claim 1 further comprising a third terminal member connected to said second triac terminal, said third terminal member having a male terminal part.

10. The device of claim 9 wherein said motor start-up component further includes a third connector member which is connected in series with said main coil and has a third male terminal part, and wherein said third terminal member also has a female terminal part capable of accepting said third male terminal part.

11. The device of claim 1 wherein said motor start-up component further includes a third connector member which is connected in series with said main coil and has a third male terminal part, and wherein said device further comprises a female terminal part capable of accepting said third male part and a fourth terminal member having a male terminal part.

\* \* \* \* \*